(12) United States Patent
Frison

(10) Patent No.: US 11,853,310 B1
(45) Date of Patent: Dec. 26, 2023

(54) TIME-BASED QUERY PROCESSING IN ANALYTICS COMPUTING SYSTEM

(71) Applicant: SAP SE, Walldorf (DE)

(72) Inventor: Giancarlo Frison, Mammendorf (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/078,558

(22) Filed: Dec. 9, 2022

(51) Int. Cl.
*G06F 16/24* (2019.01)
*G06F 16/2458* (2019.01)
*G06F 16/2455* (2019.01)

(52) U.S. Cl.
CPC .... *G06F 16/2477* (2019.01); *G06F 16/24566* (2019.01)

(58) Field of Classification Search
CPC .......... G06F 16/2477; G06F 16/24566
See application file for complete search history.

(56) References Cited

U.S. PATENT DOCUMENTS

2021/0073235 A1* 3/2021 Li ................ G06F 16/2471

OTHER PUBLICATIONS

Kowalski, Robert, "A logic-based calculus of events", New Generation Computing, 4, (1986), 67-94.

* cited by examiner

*Primary Examiner* — Baoquoc N To
(74) *Attorney, Agent, or Firm* — SCHWEGMAN LUNDBERG & WOESSNER, P.A.

(57) ABSTRACT

Various examples are directed to systems and methods for processing queries against a process model. An analytics computing system may access query data describing a query to an analytics computing system. The analytics computing system may access process model code that comprises first function code for evaluating a function having a first input and a second input. The first function code may indicate that the first input is at a first time context corresponding to a first discrete time. And that the second input is at a second time context corresponding to a second discrete time period adjacent the first discrete time period. The analytics computing system may execute the process model code using a value for a first input at the first discrete time period and a value for a second input at the second discrete time period.

18 Claims, 5 Drawing Sheets

TIME-BASED QUERY PROCESSING IN ANALYTICS COMPUTING SYSTEM

BACKGROUND

Analytics computing systems are implemented for enterprises, such as business enterprises, to provide analysis of data. An analytics computing system may include software and/or hardware that are arranged to gather, integrate, analyze, and/or present insights regarding underlying data to various users.

BRIEF DESCRIPTION OF DRAWINGS

The present disclosure is illustrated by way of example and not limitation in the following figures.

DETAILED DESCRIPTION

Figure 1:
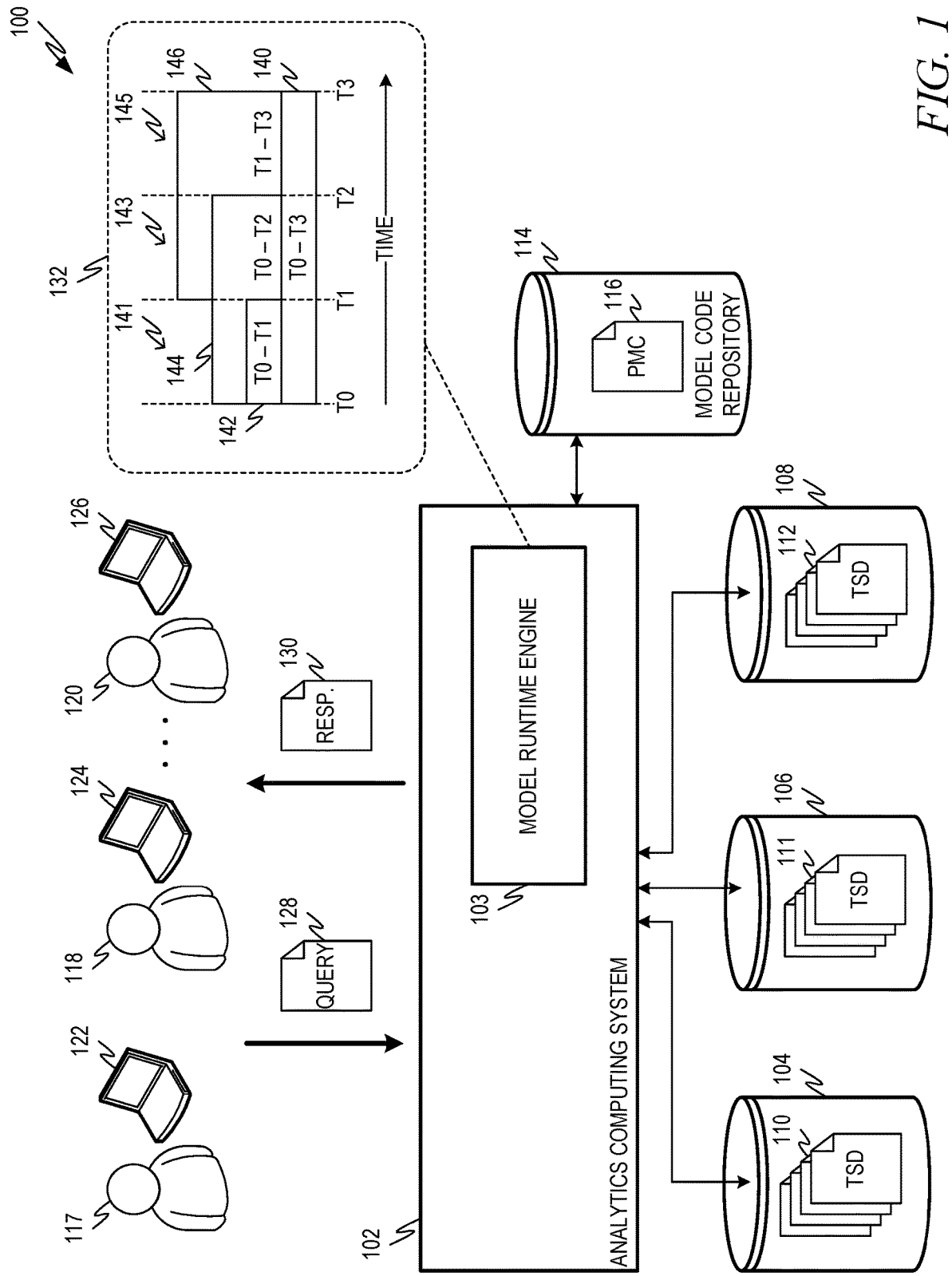
FIG. 1 is a diagram showing one example of an environment including an analytics computing system configured to execute process model code with one or more inputs determined in view of time contexts.

It is desirable for enterprises to model various complex business and/or technical processes. For example, process modeling may be used to enhance the robustness and resilience of business and/or technical processes to unfavorable events, to improve forecasts related to the processes, and the like. Consider an example technical process for preparing a chemical product. Such a technical process may include multiple different operations involving different substances with the operations being performed at different times and for different durations. An enterprise implementing the example technical process may use a computer-implemented process model to make predictions about the behavior of the process and/or to understand the response of the process to different variations that may occur. Consider another example in which an enterprise executes a manufacturing process to manufacture a product. The manufacturing process may include various different steps and may incorporate items that are added to and retrieved from inventory during the process. Similar to the prior example, an enterprise implementing such a manufacturing process may use a computer-implemented process model to understand the response of the process to variations that may occur.

Modeling complex processes may involve representing and evaluating long chains of time-dependent data values that depend on one another, for example, as cause-and-effect. A model that does not reflect the full complexity of a process may misrepresent risks to the process, which may cause business loss. Another challenge associated with modeling complex processes is the modeling of time. A process model, for example, may receive and utilize various parameters that have different values or states at different times.

Further, the relationship between parameter values at different times may be relevant for a process model. A computing system, such as a database management system, may store values for parameters at different times. In various examples however the data stored at a database management system or other system may not be correlated with other data in time. The complexities of using a computing device to obtain and process time-specific parameters make it more difficult to build and use a complete process model.

One way to address these challenges is to employ a human analyst or team of human analysts to generate process models using a spreadsheet or similar software tool. For example, the spreadsheet may be arranged with columns where different columns correspond to different times or different time periods. Although these techniques may generate accurate models when executed with great care, the manual creation of the models can consume considerable human resources. Also, manually-created models may be incomplete and/or erroneous. Further, models constructed manually in a spreadsheet or similar software tool may not be user-friendly. It may be necessary for a business user wishing to use the model to work with an analyst familiar with the structure of the spreadsheet or other implementation of the model in order to derive useful information.

Various examples address these and other challenges utilizing an analytics computing system that is programmed to execute queries against a process model using process model code configured to describe inputs according to discrete time periods. The analytics computing system may be programmed with process model code that, when executed at the analytics computing system, causes the analytics computing system to determine one or more parameters based on the modeled process. The process model code may describe inputs in terms of a time context. For example, a first input may be indicated at a first discrete time, such as a current time period, a second input may be indicated in the process model code at a second discrete time different than the first discrete time.

Inputs to the process model may be of various different types. In some examples, one or more inputs to the process model may be variables having a numeric value. In some examples, one or more inputs to the process model may be variables having a value described by a string. In some examples, one or more inputs to the process models may be state variables. A state variable has a value selected from a group of allowable values for the state variable. Consider an example state variable describing the status of a manufactured item. In some examples, the state variable may take a state called "in progress," "completed," "in inventory," and/or the like. In some example, a state variable may be a Boolean having a value of "true" or "false."

In some examples, the process model code may include one or more time context switching operators indicating a relationship between the respective time contexts of different inputs. Consider the first input and the second input from the example above. A time context switching operator may indicate that the first discrete time for the first time context is immediately after the second discrete time for the second context or immediately before the second discrete time for the second time context.

When the process model code, or portions thereof, is executed at the analytics computing system, the analytics computing system may fetch values for the indicated inputs at the indicated time contexts from one or more data sources in communication with the analytics computing system. The fetched values may be used, for example, to respond to queries against the process model.

Process model code, as described herein, may facilitate process models at an analytics computing system that can be more easily constructed and can more simply and accurately represent the modeled process. Further, an analytics computing system executing a process model, as described herein, may support queries that make the process model more accessible to users, including users who may not have technical training. For example, an analytics computing system arranged as described herein may support simple queries from users based on a business or other non-technical description of various inputs.

FIG. 1 is a diagram showing one example of an environment 100 including an analytics computing system 102 configured to execute process model code 116 with one or more inputs determined in view of time contexts, as described herein. The analytics computing system 102 can be configured to perform various tasks using analytics computing system 102 resources such as, for example, data sources 104, 106, 108 and model resources, such as the process model implemented by process model code 116. Tasks performed by an analytics computing system 102 can include, for example, providing various reports, forecasts, responses to user queries, and/or the like based on underlying resources. An example analytics computing system 102 is the SAP® Analytics Cloud application available from SAP SE of Waldorf, Germany.

In some examples, the analytics computing system 102 is implemented in an on-premise environment. For example, a consumer enterprise utilizing the analytics computing system may maintain an on-premise computing system. The analytics computing system 102 may be implemented by executing appropriate software at the on-premise computing system. Users 117, 118, 120 associated with the consumer enterprise may access the analytics computing system 102 by accessing the on-premise computing system.

In some examples, the analytics computing system 102 is implemented in a cloud environment. For example, the analytics computing system 102 may be implemented in a public cloud environment or in a private cloud environment. In a private cloud environment, the consumer enterprise may provide applications, implement storage, and the like, to implement the analytics computing system 102 at the private cloud environment. Executables and/or other software for implementing the analytics computing system 102 at the private cloud environment may be provided, for example, by a software provider. Users 117, 118, 120 of the consumer enterprise may access the analytics computing system 102 at the private cloud environment, for example, to request, configure, and/or consume the analytics reports and/or other outputs of the analytics computing system 102.

In a public cloud environment, a cloud environment is arranged into a number of tenancies implemented by a cloud service provider. The cloud service provider may provide one or more executables or other components to implement the analytics computing system 102 at the public cloud environment. The consumer enterprise may hold one or more tenancies, allowing users 117, 118, 120 of the consumer enterprise to access one or more instances of the analytics computing system 102 at the public cloud environment to consume analytics reports, query responses, and/or other outputs of the analytics computing system 102.

The analytics computing system 102 may be in communication with various data sources 104, 106, 108. The data sources 104, 106, 108 may be or include various different computing systems and/or services for storing data. The data stored at the data sources 104, 106, 108 can be used by the analytics computing system 102 to generate various analytics outputs such as, reports, forecasts, responses to user queries, and/or the like, as described herein.

Data sources 104, 106, 108 may include cloud-delivered data source services and/or on-premise implemented data sources. For example, a cloud service provider may implement the cloud-delivered data source services in a public cloud environment. In some examples, one or more of the data sources 104, 106, 108 is implemented in a private cloud environment, for example, by the consumer enterprise. Examples of cloud-delivered data source services may include cloud versions of S/4 HANA™, SAP Concur®, SAP Successfactors®, SAP Data Warehouse Cloud, Inbound Document (IBD), available from SAP SE of Waldorf, Germany. Other examples of cloud-delivered data sources may include SQL database services such as, for example, BigQuery® available from Google, LLC of Mountain View, California, Sharepoint® available from Microsoft Corporation of Redmond, Washington, various data storage products available from Salesforce, Inc. of San Francisco, California, and/or the like.

On-premise data sources may be implemented at one or more on-premise computing systems, which may be maintained by the consumer entity and/or another suitable entity. Examples of on-premise data sources may include, on-premise versions of S/4 HANA™, SAP Business Warehouse, SAP Business Planning and Consolidation, SAP HANA™, various SQL or other database management systems executed at an on-premise computing system and/or the like.

Data sources 104, 106, 108 may comprise various types of data including time-stamped data 110, 111, 112. Time stamped data 110, 111, 112 may include data that describes a quantity, state, or other similar value at a particular time. Consider an example data item describing a level of inventory at a warehouse. The data item may have various entries in the time stamped data 110, 111, 112 marked at different times. For example, the inventory may include X items at a first time, Y items at a second time, and so on. Consider another example data item describing a temperature of a chemical process. The temperature may be A degrees at a first time and B degrees at a second time.

Users 117, 118, 120 may be associated with the consumer enterprise utilizing the analytics computing system 102. The users 117, 118, 120 may access the analytics computing system 102 and/or one or more of the various data sources 104, 106, 108 utilizing user computing devices 122, 124, 126. User computing devices 122, 124, 126 may be or include various different types of computing devices such as, for example, desktop computers, laptop computers, tablet computers, mobile computing devices, and/or the like.

The analytics computing system 102 may also be in communication with the model code repository 114. The model code repository 114 may be implemented with the analytics computing system 102 and/or may be implemented as a data source similar to the data sources 104, 106, 108. In the example of FIG. 1, the model code repository 114 comprises process model code 116. The process model code 116 may be executed at the analytics computing system 102 to implement a model of a process, such as a business or technical process associated with the consumer enterprise.

The program model code 116 may receive various inputs. An input to the program model code may be a quantity, state, and/or the like that is operated on by the analytics computing system 102 to implement the process model described by the process model code 116. In some examples, inputs to the program model code 116 may be described with respect to various time contexts. A time context may describe a discrete time period such as, for example, a second, a predetermined number of seconds, an hour, a predetermined number of hours, a day, a predetermined number of days, a week, a predetermined number of weeks, a month, a predetermined number of months, a quarter, a predetermined number of quarters, a year, a predetermined number of years, and/or the like.

The analytics computing system 102 also comprises a model runtime engine 103. The model runtime engine 103 may be configured to execute process model code 116 from the model code repository 114. In some examples, model runtime engine 103 may be configured to respond to queries from users 117, 118, 120, such as the query 128. The model runtime engine 103 may be configured to execute process model code 116 in various forms. In some examples, some or all of the process model code 116 is compiled object code. In examples in which some or all of the process model code 116 comprises compiled object code, time context switching operators included in the process model code may be represented as object code. The model runtime engine 103 may be configured to recognize and operate on object code-represented time context switching operators as described herein. In some examples, some or all of the process model code is or includes interpreted code that is compiled at runtime by the model runtime engine 103.

The model runtime engine 103 may be configured to execute process model code 116 including inputs in different time contexts. For example, FIG. 1 shows a breakout chart 132 illustrating for example inputs across three time contexts. In the breakout chart 132, time is illustrated from the two right as shown by the labeled arrow. Four times are illustrated: T0, T1, T2, and T3 along with three time contexts. A first time context 141 corresponds to a discrete time. Between time T0 and time T1. A second time context 143 corresponds to a second discrete time period between time T1 and time T2. A third time context 145 corresponds to a third discrete time period between time T2 and time T3. Four inputs 140, 142, 144, 146 are shown. The value of the input 140 is constant over time contexts 141, 143, and 145. The value of input 142 is constant for time context 141 only. The value of input 144 is constant over time contexts 141 and 143. The value of input 146 is constant over time contexts 143 and 145.

In some examples one or more of the users 117, 118, 120 may direct a query 128 to the analytics computing system 102 (e.g., the model runtime engine 103 thereof). The query 128 may request information based on the process model implemented by the process model code 116. In response to the query 128, the analytics computing system 102 may access all or a portion of the process model code 116. The analytics computing system 102 may execute the accessed process model code 116 to generate a response 130 to the query 128. The response 130 may be provided back to the requesting user 117, 118, 120 at that user's user computing device 122, 124, 126.

Consider an example manufacturing process model implemented by an enterprise that manufactures an item, accepts orders from the customers for the product, buys raw materials from suppliers, and assembles the items to be sold. The enterprise may construct a process model to describe their operations. Such a process model may be represented by process model code, such as the process model code 116.

One example input to the process model may be a state variable indicating the status or state of a customer order. For example, a customer order may have various states including, submitted, processing, pending, processed, delayed, and/or the like. The orders may be submitted and processed according to a timeline. Accordingly, different orders may take different state values in different time contexts. For example, in a time context corresponding to the time when an order was submitted, the state of the order may be "submitted" in a time context corresponding to a period when the order is in processing, the state of the order may be "processing," and so on. Data describing values for the customer order input may be stored at the various data sources 104, 106, 108 as time stamped data 110, 111, 112. For example, an accounting database may store an indication that a customer order has been submitted at a given time. The accounting database may store an indication of when the customer order reaches various other life stages such as, for example, the beginning of processing, the end of processing, whether the customer order is delayed, and/or the like. To evaluate code from the process model code 116 based on the customer order input, the analytics computing system 102 may access relevant time stamped data 110, 111, 112 and derive a value for the customer order input in the relevant time context.

Consider another example input to the example process model related to an inventory level for a component of the item to be produced. The inventory level may be a quantity having different values at different time contexts. Data describing values for the inventory input may be stored at the various data sources 104, 106, 108 as time stamped data 110, 111, 112. For example, an inventory related database may store values for the inventory at different times. Also, for example, an inventory related database may store indications of materials being checked in or checked out of the inventory, with a stamps indicating when the materials were checked in our checked out of the inventory. To evaluate code from the process model code 116 based on the inventory level input, the analytics computing system 102 may access relevant time stamped data 110, 111, 112 and derive a value for the inventory level in a relevant time context.

In some examples, the process model code 116 may include function code for implementing various functions of the process model. Different functions may receive different inputs in different time contexts and generate corresponding function outputs. Consider again the manufacturing process model described above. Such a model may have an example function for determining the availability of raw materials. Pseudo-code for implementing such a function in view of different time contexts is provided by Code Fragment 1 below:

$$\text{availability}(x+y)<=\text{supply}(x),<<\text{inventory}(y) \quad [1]$$

In example Code Fragment 1, the quantity of available material is a sum of material supplied during a current time context, represented by "x," and what material was already present in inventory at the immediately prior time context, represented by "y." The example Code Fragment 1 also includes a time context switching operator, in this example illustrated by "<<" The time context switching operator provides an instruction to the model runtime engine 103 indicating that the model runtime engine 103 should consider the input "inventory (y)" in a time context that is immediately prior to the time context of the input "supply (x)." Accordingly, when executing function code similar to the Code Fragment 1, the runtime engine 103 may access time-stamped data 110, 111, 112 describing a value for the input "supply (x)" at a first time context corresponding to a first discrete time period. Data for the input "inventory (y)" may be obtained from time-stamped data 110, 111, 112 describing a value for the input at a second time context corresponding to a second discrete time period prior to, and in some example immediate relatedly prior to, the first discrete time period.

Consider example Code Fragment 2 below, which shows example function code for evaluating a function to indicate a current production according to the manufacturing process:

$$\text{processing}(X), \text{pending}(Y\text{-}X), \text{inventory}(A\text{-}X) <=<<\text{delayed}(D), <<\text{pending}(P), \text{submitted}(S) \ Y:=D+P+S,$$
$$\text{availability}(A), \min(\text{capacity}(\_), A, C), \min(Y, C, X) \quad [2]$$

In the example of Code Fragment 2, current production "processing (X)" depends on availability "availability (A)" and capacity "min(capacity(_), A, C), min(Y, C, X), as well as delayed orders "delayed(D)," pending orders "pending (P)" and new submitted orders "submitted (S)." In the example Code Fragment 2, the inputs delayed orders "delayed(D)" and pending orders "pending (P)" are modified by a time context switching operator "<<" to indicate to the model runtime engine 103 that these inputs are in the time context prior to the time context of the inputs not modified by the context switching operator.

Consider example Code Fragment 3 below, which shows function code for executing a function for determining a number of orders delayed in production.

$$\text{processed}(X^*(1\text{-}D)), \text{delayed}(X^*D) <=<<\text{processing}$$
$$(X), \text{toDelay}(D) \quad [3]$$

In the example of Code Fragment 3, the number of orders delayed in production is a function of orders that were processed in a prior time context "processing(X)" and orders that were delayed in a time context current "toDelay(D)." As shown in the pseudocode of Code Fragment 3, the time context switching operator "<<" is used to indicate that the orders processed relates to the time context immediately adjacent to the time context for the other inputs.

Also consider example Code Fragment 4 below, which shows function code for determining a cumulative delivery cost according to the example manufacturing process:

$$\text{costDelivery}(X^*DC+\text{Prev}) <= \text{processed}(X), \text{delivery-}$$
$$\text{Cost}(DC), <<\text{costDelivery}(\text{Prev}) \quad [4]$$

In the example of Code Fragment 4, the cost of delivery is a function of the processed orders, the delivery cost of the processed orders, and the delivery cost from the previous time context. The context switching operator "<<" before the call to the cost delivery function "costDelivery(Prev)" may be interpreted by the model runtime engine to indicate that the function "costDelivery" is to be executed with respect to the previous time context.

As shown, the function code for the cost of delivery "costDelivery" is a recursive function that calls itself with respect to the immediate previous time context. For example, to determine the cost of delivery according to the example Code Fragment 4, the model runtime engine 103 may execute the cost of delivery function at the time context corresponding to the discrete time period immediately prior to the current time context. Recursive calls to the cost of delivery function may continue until the cost of delivery is found for a zero time context. The zero time context may be a first time context considered by the process model. In some examples, the zero time context is specified by a query 128. For example, a user 117, 118, 120 may request a cumulative cost of delivery since the zero time context, and may specify the zero time context as in input.

Consider also Code Fragment 5, which shows function code for determining a cumulative storage cost according to the manufacturing process model example:

$$\text{costStorage}(Y^*I/IB+\text{Prev}) <= \text{blockCost}(Y), \text{inventory}$$
$$(I), \text{itemsBlock}(IB), <<\text{costStorage}(\text{Prev}) \quad [5]$$

The example function code shown by Code Fragment 5 is also a recursive function which calls itself in the previous adjacent time context, as indicated by the time context switching operator "<<." The model runtime engine 103 may be configured to interpret the time context switching operator as an indication that the cost of storage function should be recalled in the time context immediately previous to the currently consider time context. Recursive calls to the cost of storage function may continue until a zero time context is considered.

Based on the example Code Fragments 1-5, consider the following example query 128: "what is the cost of storage and delivery as of the end of Q3?" Upon receiving this example query, the analytics computing system 102 may call the model runtime engine and access a process model code, including function code for the cost of delivery function "costDelivery" and the cost of storage function "costStorage." The model runtime engine 103 may execute the function code to find the cost of delivery and the cost of storage beginning at a current time context, which for this query may be Q3, and extending backwards to a zero time context, which for this example query may be the beginning of the relevant year.

Figure 2:
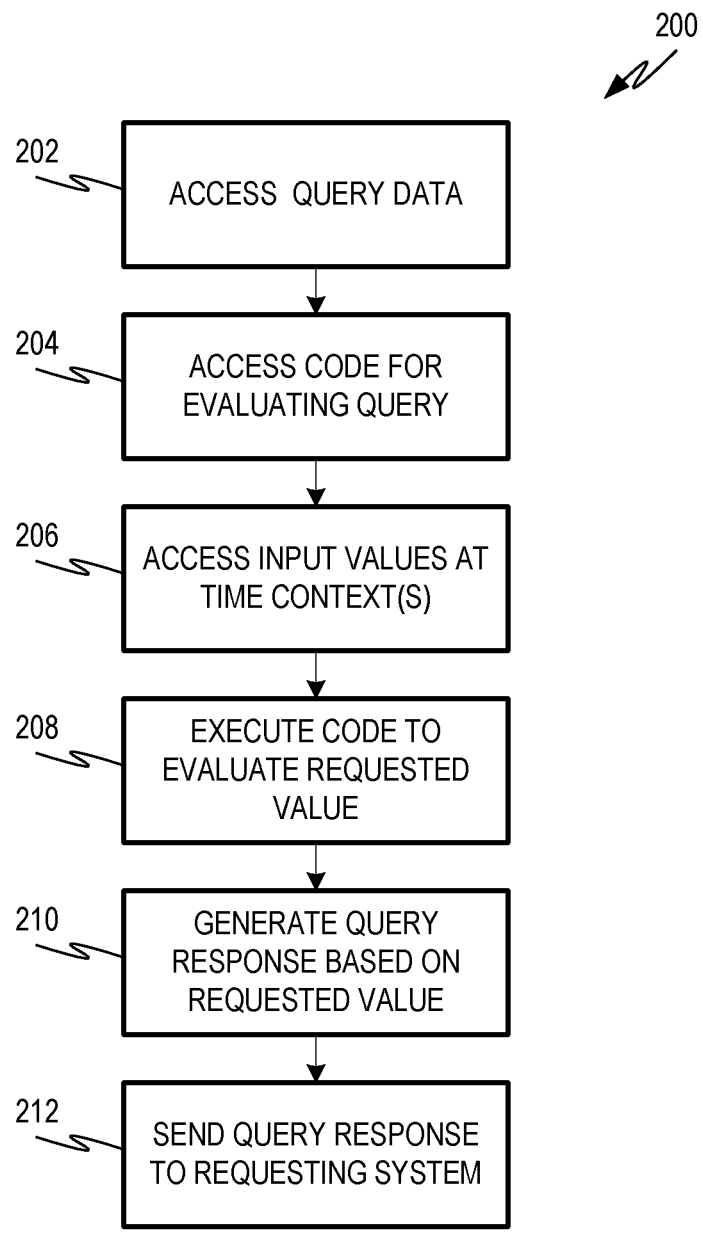
FIG. 2 is a process flow showing one example of a process flow that may be executed in the environment of FIG. 1 to respond to a query against a process model.

FIG. 2 is a process flow showing one example of a process flow 200 that may be executed in the environment 100 of FIG. 1 to respond to a query 128 against a process model. At operation 202, the analytics computing system 102 may access query data. The query data may be received from a user 117, 118, 120 at a user computing device 122, 124, 126, as described herein. In some examples, the model runtime engine 103 may access the query data from in other subsystem of the analytics computing system 102.

At operation 204, the analytics computing system (e.g., the model runtime engine 103 thereof) may access process model code 116 for evaluating the query. The process model code 116 may include function code for at least one function. At operation 206, the analytics computing system 102 (e.g., the model runtime engine 103 thereof) may access input values for inputs referenced by the process model code 116. For example, the analytics computing system may retrieve a stamped data 110, 111, 112 from one or more of the data sources 104, 106, 108. The analytics computing system 102 (e.g., the model runtime engine 103 thereof) may select appropriate time stamped data 110, 111, 112 based on the time context for the inputs indicated by the process model code.

At operation 208, the analytics computing system 102 may execute the process model code to evaluate the value requested by the query data. At operation 210, the analytics computing system 102 may generate a query response 130 based on the value determined at operation 208. At operation 212, the analytics computing system may send the query response 130 to the user computing device 122, 124, 126 of the requesting user 117, 120, 120.

Figure 3:
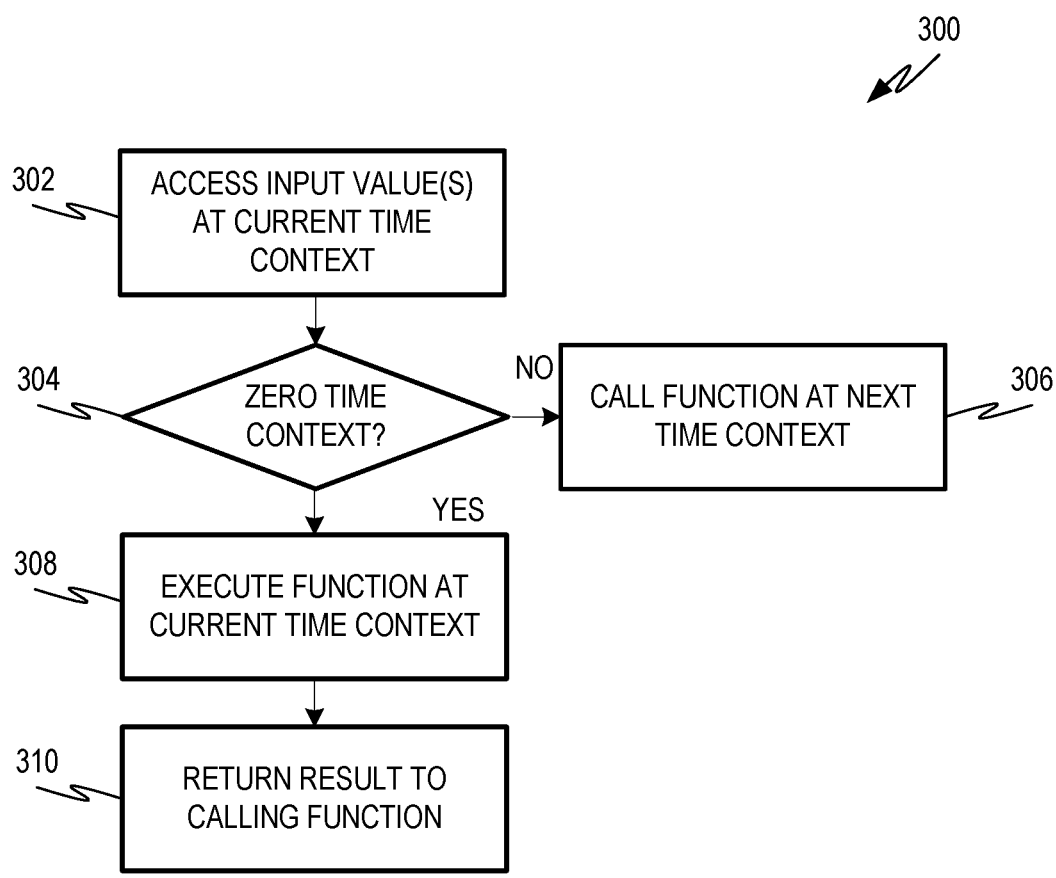
FIG. 3 is a flowchart showing one example of a process flow that may be executed in the environment of FIG. 1 to execute function code associated with a recursive function.

FIG. 3 is a flowchart showing one example of a process flow 300 that may be executed in the environment 100 of FIG. 1 to execute function code associated with a recursive function. A recursive function, in some examples, is a function that calls itself in a different time context. For example the function code of Code Fragments 4 and 5 above are recursive functions that call themselves in the time context immediately prior to a current time context.

At operation 302, the analytics computing system 102 (e.g., the model runtime engine 103 thereof) may access one or more input values referenced by the function code for a current time context. At operation 304, the analytics computing system 102 (e.g. the model runtime engine 103 thereof) may determine whether the current time context is the zero time context. As described herein, the zero time context may be indicated by our based on a query 128 received by the analytics computing system 102. If the current time context is not the zero time context, then the analytics computing system 102 (e.g., the model runtime engine 103 thereof) may call the function recursive late at the next time context at operation 306. For example, as described herein, the function code for the function may include an indication of the function itself modified by a time context switching operator to indicate the time context in which the function is to be recursive recalled.

If, at operation 304, it is determined that the current time context is the zero time context then the analytics computing system 102 (e.g., the model runtime engine 103 thereof) may execute the function according to the function code at the current time context at operation 308. The result of the execution may be returned to the calling function at operation 310.

Examples

Example 1 is a computing system for processing queries against a process model, comprising: at least one processor programmed to perform operations comprising: accessing query data describing a query from a user computing device; accessing process model code, the process model code comprising first function code for evaluating a function having a first input and a second input, the first function code indicating that the first input is at a first time context corresponding to a first discrete time period and the second input is at a second time context corresponding to a second discrete time period adjacent the first discrete time period; accessing, from a data source, a value for the first input at the first discrete time period; accessing, from the data source, a value for the second input at the second discrete time period; executing the process model code, the executing of the process model code using the value for the first input at the first discrete time period and the value for the second input at the second discrete time period; generating a response to the query based at least in part on the executing of the process model code; and sending the response to the query to the user computing device.

In Example 2, the subject matter of Example 1 optionally includes the first function code comprising: an indicator of the first input; an indicator of the second input; and a time context switching operator indicating that the second input is in the second time context and that the second discrete time period corresponding to the second time context is prior to the first discrete time period corresponding to the first time context.

In Example 3, the subject matter of any one or more of Examples 1-2 optionally includes the first function code comprising: an indicator of the first input; an indicator of the second input; and a time context switching operator indicating that the second input is in the second time context and that the second discrete time period corresponding to the second time context is after to the first discrete time period corresponding to the first time context.

In Example 4, the subject matter of any one or more of Examples 1-3 optionally includes the first input describing a state variable having a value selected from a set of predetermined states, the operations further comprising determining a state of the first input at the first discrete time period.

In Example 5, the subject matter of any one or more of Examples 1-4 optionally includes the first input describing a quantity, the first input at the first discrete time period describing a value for the quantity at the first discrete time period.

In Example 6, the subject matter of any one or more of Examples 1-5 optionally includes the process model code further comprising second function code for evaluating a second function describing a sum of a third input over a range of time contexts.

In Example 7, the subject matter of Example 6 optionally includes the second function code comprising: an indicator of the third input; a recursive call to the second function; and a time context switching operator indicating that the recursive call to the second function is at a time context immediately prior to the first time context.

In Example 8, the subject matter of any one or more of Examples 6-7 optionally includes the range of time contexts being from the first time context to a zero time context.

In Example 9, the subject matter of any one or more of Examples 1-8 optionally includes the process model code comprising at least one of object code or interpreted code.

Example 10 is a method for processing queries against a process model in an analytics computing system, the method comprising: accessing query data describing a query to the analytics computing system from a user computing device; accessing process model code, the process model code comprising first function code for evaluating a function having a first input and a second input, the first function code indicating that the first input is at a first time context corresponding to a first discrete time period and the second input is at a second time context corresponding to a second discrete time period adjacent the first discrete time period; accessing, from a data source in communication with the analytics computing system, a value for the first input at the first discrete time period; accessing, from the data source, a value for the second input at the second discrete time period; executing the process model code, the executing of the process model code using the value for the first input at the first discrete time period and the value for the second input at the second discrete time period; generating a response to the query based at least in part on the executing of the process model code; and sending the response to the query to the user computing device.

In Example 11, the subject matter of Example 10 optionally includes the first function code comprising: an indicator of the first input; an indicator of the second input; and a time context switching operator indicating that the second input is in the second time context and that the second discrete time period corresponding to the second time context is prior to the first discrete time period corresponding to the first time context.

In Example 12, the subject matter of any one or more of Examples 10-11 optionally includes the first function code comprising: an indicator of the first input; an indicator of the second input; and a time context switching operator indicating that the second input is in the second time context and that the second discrete time period corresponding to the second time context is after to the first discrete time period corresponding to the first time context.

In Example 13, the subject matter of any one or more of Examples 10-12 optionally includes the first input describing a state variable having a value selected from a set of predetermined states, the method further comprising determining a state of the first input at the first discrete time period.

In Example 14, the subject matter of any one or more of Examples 10-13 optionally includes the first input describing a quantity, the first input at the first discrete time period describing a value for the quantity at the first discrete time period.

In Example 15, the subject matter of any one or more of Examples 10-14 optionally includes the process model code further comprising second function code for evaluating a second function describing a sum of a third input over a range of time contexts.

In Example 16, the subject matter of Example 15 optionally includes the second function code comprising: an indicator of the third input; a recursive call to the second function; and a time context switching operator indicating that the recursive call to the second function is at a time context immediately prior to the first time context.

In Example 17, the subject matter of any one or more of Examples 15-16 optionally includes the range of time contexts being from the first time context to a zero time context.

In Example 18, the subject matter of any one or more of Examples 10-17 optionally includes the process model code comprising at least one of object code or interpreted code.

Example 19 is a non-transitory machine-readable medium comprising instructions thereon that, when executed by at least one processor, cause the at least one processor to perform operations comprising: accessing query data describing a query to an analytics computing system from a user computing device; accessing process model code, the process model code comprising first function code for evaluating a function having a first input and a second input, the first function code indicating that the first input is at a first time context corresponding to a first discrete time period and the second input is at a second time context corresponding to a second discrete time period adjacent the first discrete time period; accessing, from a data source, a value for the first input at the first discrete time period; accessing, from the data source a, a value for the second input at the second discrete time period; executing the process model code, the executing of the process model code using the value for the first input at the first discrete time period and the value for the second input at the second discrete time period; generating a response to the query based at least in part on the executing of the process model code; and sending the response to the query to the user computing device.

In Example 20, the subject matter of Example 19 optionally includes the first function code comprising: an indicator of the first input; an indicator of the second input; and a time context switching operator indicating that the second input is in the second time context and that the second discrete time period corresponding to the second time context is prior to the first discrete time period corresponding to the first time context.

Figure 4:
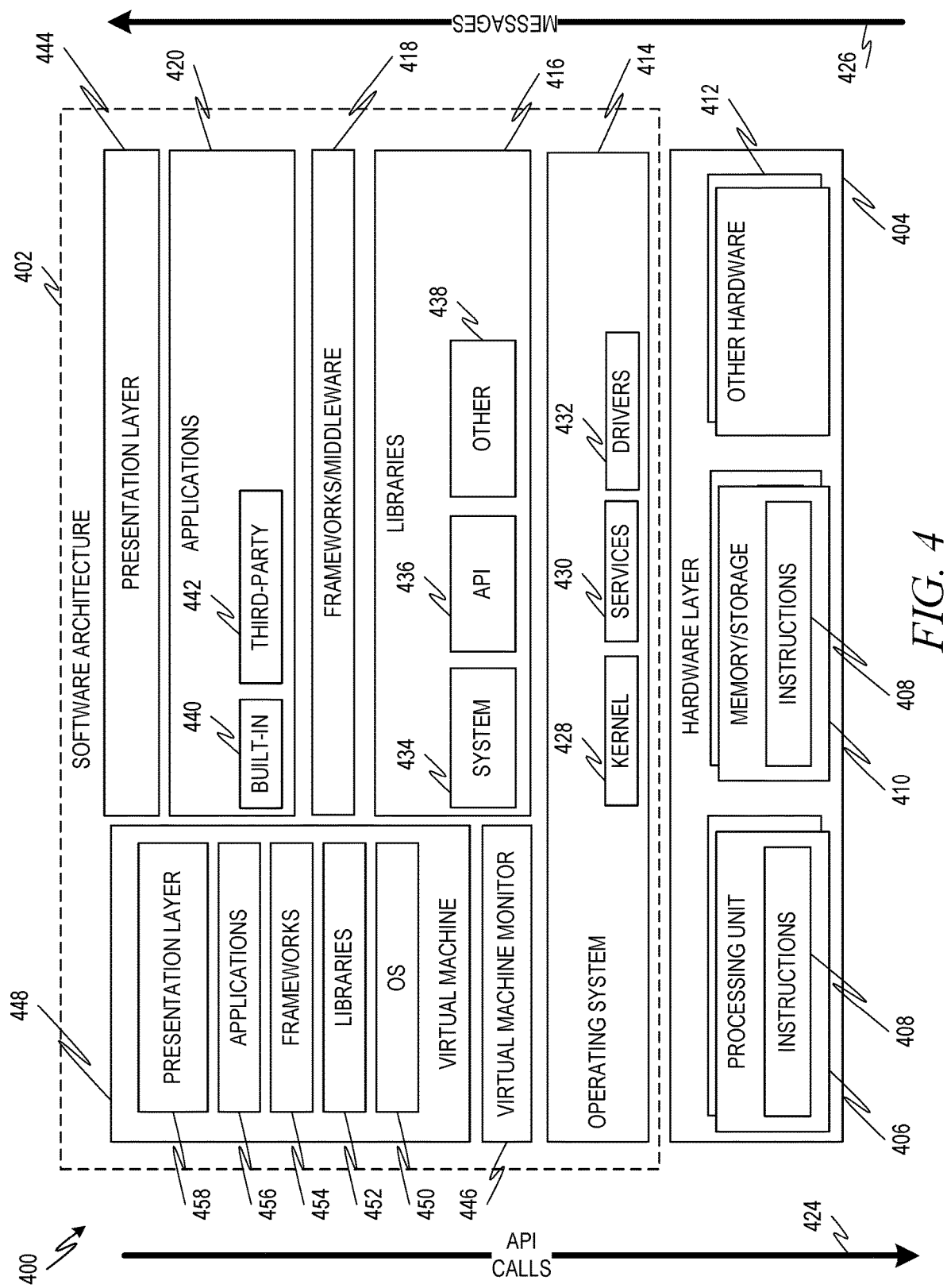
FIG. 4 is a block diagram showing one example of an architecture for a computing device.

FIG. 4 is a block diagram 400 showing one example of a software architecture 402 for a computing device. The architecture 402 may be used in conjunction with various hardware architectures, for example, as described herein. FIG. 4 is merely a non-limiting example of a software architecture and many other architectures may be implemented to facilitate the functionality described herein. A representative hardware layer 404 is illustrated and can represent, for example, any of the above referenced computing devices. In some examples, the hardware layer 404 may be implemented according to the architecture of the computer system of FIG. 5.

The representative hardware layer 404 comprises one or more processing units 406 having associated executable instructions 408. Executable instructions 408 represent the executable instructions of the software architecture 402, including implementation of the methods, modules, subsystems, and components, and so forth described herein and may also include memory and/or storage modules 410, which also have executable instructions 408. Hardware layer 404 may also comprise other hardware as indicated by other hardware 412 which represents any other hardware of the hardware layer 404, such as the other hardware illustrated as part of the architecture 402.

In the example architecture of FIG. 4, the software architecture 402 may be conceptualized as a stack of layers where each layer provides particular functionality. For example, the software architecture 402 may include layers such as an operating system 414, libraries 416, middleware layer 418, applications 420, and presentation layer 444. Operationally, the applications 420 and/or other components within the layers may invoke API calls 424 through the software stack and access a response, returned values, and so forth illustrated as messages 426 in response to the API calls 424. The layers illustrated are representative in nature and not all software architectures have all layers. For example, some mobile or special purpose operating systems may not provide a middleware layer 418, while others may provide such a layer. Other software architectures may include additional or different layers.

The operating system 414 may manage hardware resources and provide common services. The operating system 414 may include, for example, a kernel 428, services 430, and drivers 432. The kernel 428 may act as an abstraction layer between the hardware and the other software layers. For example, the kernel 428 may be responsible for memory management, processor management (e.g., scheduling), component management, networking, security settings, and so on. The services 430 may provide other common services for the other software layers. In some examples, the services 430 include an interrupt service. The interrupt service may detect the receipt of an interrupt and, in response, cause the architecture 402 to pause its current processing and execute an interrupt service routine (ISR) when an interrupt is accessed.

The drivers 432 may be responsible for controlling or interfacing with the underlying hardware. For instance, the drivers 432 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 416 may provide a common infrastructure that may be utilized by the applications 420 and/or other components and/or layers. The libraries 416 typically provide functionality that allows other software modules to perform tasks in an easier fashion than to interface directly with the underlying operating system 414 functionality (e.g., kernel 428, services 430 and/or drivers 432). The libraries 416 may include system 434 libraries (e.g., C standard library) that may provide functions such as memory allocation functions, string manipulation functions, mathematic functions, and the like. In addition, the libraries 416 may include API libraries 436 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 416 may also include a wide variety of other libraries 438 to provide many other APIs to the applications 420 and other software components/modules.

The middleware layer 418 (also sometimes referred to as frameworks) may provide a higher-level common infrastructure that may be utilized by the applications 420 and/or other software components/modules. For example, the middleware layer 418 may provide various graphic user interface (GUI) functions, high-level resource management, high-level location services, and so forth. The middleware layer 418 may provide a broad spectrum of other APIs that may be utilized by the applications 420 and/or other software components/modules, some of which may be specific to a particular operating system or platform.

The applications 420 includes built-in applications 440 and/or third-party applications 442. Examples of representative built-in applications 440 may include, but are not limited to, a contacts application, a browser application, a book reader application, a location application, a media application, a messaging application, and/or a game application. Third-party applications 442 may include any of the built-in applications 440 as well as a broad assortment of other applications. In a specific example, the third-party application 442 (e.g., an application developed using the Android™ or iOS™ software development kit (SDK) by an entity other than the vendor of the particular platform) may be mobile software running on a mobile operating system such as iOS™ Android™, Windows® Phone, or other mobile computing device operating systems. In this example, the third-party application 442 may invoke the API calls 424 provided by the mobile operating system such as operating system 414 to facilitate functionality described herein.

The applications 420 may utilize built-in operating system functions (e.g., kernel 428, services 430 and/or drivers 432), libraries (e.g., system 434, API libraries 436, and other libraries 438), and middleware layer 418 to create user interfaces to interact with users of the system. Alternatively, or additionally, in some systems interactions with a user may occur through a presentation layer, such as presentation layer 444. In these systems, the application/module "logic" can be separated from the aspects of the application/module that interact with a user.

Some software architectures utilize virtual machines. In the example of FIG. 4, this is illustrated by virtual machine 448. A virtual machine creates a software environment where applications/modules can execute as if they were executing on a hardware computing device. A virtual machine is hosted by a host operating system (operating system 414) and typically, although not always, has a virtual machine monitor 446, which manages the operation of the virtual machine as well as the interface with the host operating system (i.e., operating system 414). A software architecture executes within the virtual machine such as an operating system 450, libraries 452, frameworks/middleware 454, applications 456 and/or presentation layer 458. These layers of software architecture executing within the virtual machine 448 can be the same as corresponding layers previously described or may be different.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client, or server computer system) or one or more hardware processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Example Machine Architecture and
Machine-Readable Medium

Figure 5:
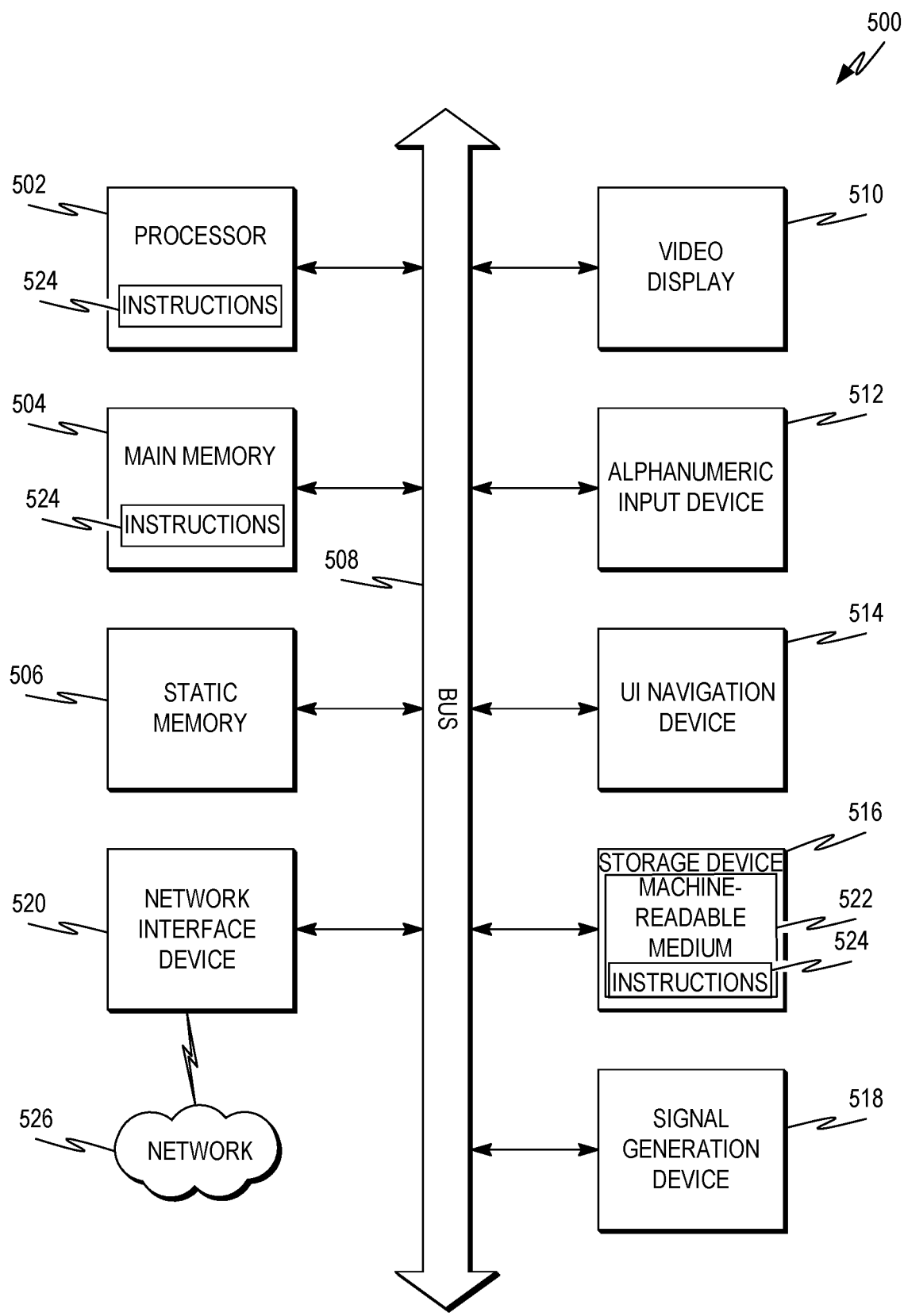
FIG. 5 is a block diagram of a machine in the example form of a computer system within which instructions may be executed for causing the machine to perform any one or more of the methodologies discussed herein.

FIG. 5 is a block diagram of a machine in the example form of a computer system 500 within which instructions 524 may be executed for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processor 502 (e.g., a central processing unit (CPU), a graphics processing unit (GPU), or both), a main memory 504, and a static memory 506, which communicate with each other via a bus 508. The computer system 500 may further include a video display unit 510 (e.g., a liquid crystal display (LCD) or a cathode ray tube (CRT)). The computer system 500 also includes an alphanumeric input device 512 (e.g., a keyboard or a touch-sensitive display screen), a user interface (UI) navigation (or cursor control) device 514 (e.g., a mouse), a disk drive unit 516, a signal generation device 518 (e.g., a speaker), and a network interface device 520.

Machine-Readable Medium

The disk drive unit 516 includes a machine-readable medium 522 on which is stored one or more sets of data structures and instructions 524 (e.g., software) embodying or utilized by any one or more of the methodologies or functions described herein. The instructions 524 may also reside, completely or at least partially, within the main memory 504 and/or within the processor 502 during execution thereof by the computer system 500, with the main memory 504 and the processor 502 also constituting machine-readable media 522.

While the machine-readable medium 522 is shown in an example embodiment to be a single medium, the term "machine-readable medium" may include a single medium or multiple media (e.g., a centralized or distributed database, and/or associated caches and servers) that store the one or more instructions 524 or data structures. The term "machine-readable medium" shall also be taken to include any tangible medium that is capable of storing, encoding, or carrying instructions 524 for execution by the machine and that cause the machine to perform any one or more of the methodologies of the present disclosure, or that is capable of storing, encoding, or carrying data structures utilized by or associated with such instructions 524. The term "machine-readable medium" shall accordingly be taken to include, but not be limited to, solid-state memories, and optical and magnetic media. Specific examples of machine-readable media 522 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 524 may further be transmitted or received over a communications network 526 using a transmission medium. The instructions 524 may be transmitted using the network interface device 520 and any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 524 for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A computing system for processing queries against a process model, comprising:
    at least one processor programmed to perform operations comprising:
        accessing query data describing a query from a user computing device;
        accessing process model code, the process model code comprising first function code for evaluating a function having a first input and a second input, the first function code indicating that the first input is at a first time context corresponding to a first discrete time period and the second input is at a second time context corresponding to a second discrete time period adjacent the first discrete time period, the process model code comprising at least one of object code or interpreted code;
        accessing, from a data source, a value for the first input at the first discrete time period;
        accessing, from the data source, a value for the second input at the second discrete time period;
        executing the process model code, the executing of the process model code using the value for the first input at the first discrete time period and the value for the second input at the second discrete time period;
        generating a response to the query based at least in part on the executing of the process model code; and
        sending the response to the query to the user computing device.

2. The computing system of claim 1, the first function code comprising:
    an indicator of the first input;
    an indicator of the second input; and
    a time context switching operator indicating that the second input is in the second time context and that the second discrete time period corresponding to the second time context is prior to the first discrete time period corresponding to the first time context.

3. The computing system of claim 1, the first function code comprising:
    an indicator of the first input;
    an indicator of the second input; and
    a time context switching operator indicating that the second input is in the second time context and that the second discrete time period corresponding to the second time context is after to the first discrete time period corresponding to the first time context.

4. The computing system of claim 1, the first input describing a state variable having a value selected from a set of predetermined states, the operations further comprising determining a state of the first input at the first discrete time period.

5. The computing system of claim 1, the first input describing a quantity, the first input at the first discrete time period describing a value for the quantity at the first discrete time period.

6. The computing system of claim 1, the process model code further comprising second function code for evaluating a second function describing a sum of a third input over a range of time contexts.

7. The computing system of claim 6, the second function code comprising:
    an indicator of the third input;
    a recursive call to the second function; and
    a time context switching operator indicating that the recursive call to the second function is at a time context immediately prior to the first time context.

8. The computing system of claim 6, the range of time contexts being from the first time context to a zero time context.

9. A method for processing queries against a process model in an analytics computing system, the method comprising:

accessing query data describing a query to the analytics computing system from a user computing device;

accessing process model code, the process model code comprising first function code for evaluating a function having a first input and a second input, the first function code indicating that the first input is at a first time context corresponding to a first discrete time period and the second input is at a second time context corresponding to a second discrete time period adjacent the first discrete time period, the process model code comprising at least one of object code or interpreted code;

accessing, from a data source in communication with the analytics computing system, a value for the first input at the first discrete time period;

accessing, from the data source, a value for the second input at the second discrete time period;

executing the process model code, the executing of the process model code using the value for the first input at the first discrete time period and the value for the second input at the second discrete time period;

generating a response to the query based at least in part on the executing of the process model code; and sending the response to the query to the user computing device.

10. The method of claim 9, the first function code comprising:
    an indicator of the first input;
    an indicator of the second input; and
    a time context switching operator indicating that the second input is in the second time context and that the second discrete time period corresponding to the second time context is prior to the first discrete time period corresponding to the first time context.

11. The method of claim 9, the first function code comprising:
    an indicator of the first input;
    an indicator of the second input; and
    a time context switching operator indicating that the second input is in the second time context and that the second discrete time period corresponding to the second time context is after to the first discrete time period corresponding to the first time context.

12. The method of claim 9, the first input describing a state variable having a value selected from a set of predetermined states, the method further comprising determining a state of the first input at the first discrete time period.

13. The method of claim 9, the first input describing a quantity, the first input at the first discrete time period describing a value for the quantity at the first discrete time period.

14. The method of claim 9, the process model code further comprising second function code for evaluating a second function describing a sum of a third input over a range of time contexts.

15. The method of claim 14, the second function code comprising:
    an indicator of the third input;
    a recursive call to the second function; and
    a time context switching operator indicating that the recursive call to the second function is at a time context immediately prior to the first time context.

16. The method of claim 14, the range of time contexts being from the first time context to a zero time context.

17. A non-transitory machine-readable medium comprising instructions thereon that, when executed by at least one processor, cause the at least one processor to perform operations comprising:
    accessing query data describing a query to an analytics computing system from a user computing device;
    accessing process model code, the process model code comprising first function code for evaluating a function having a first input and a second input, the first function code indicating that the first input is at a first time context corresponding to a first discrete time period and the second input is at a second time context corresponding to a second discrete time period adjacent the first discrete time period, the process model code comprising at least one of object code or interpreted code;
    accessing, from a data source, a value for the first input at the first discrete time period;
    accessing, from the data source, a value for the second input at the second discrete time period;
    executing the process model code, the executing of the process model code using the value for the first input at the first discrete time period and the value for the second input at the second discrete time period;
    generating a response to the query based at least in part on the executing of the process model code; and
    sending the response to the query to the user computing device.

18. The non-transitory machine-readable medium of claim 17, the first function code comprising:
    an indicator of the first input;
    an indicator of the second input; and
    a time context switching operator indicating that the second input is in the second time context and that the second discrete time period corresponding to the second time context is prior to the first discrete time period corresponding to the first time context.

\* \* \* \* \*